United States Patent
Vaughn

(10) Patent No.: US 7,673,540 B2
(45) Date of Patent: Mar. 9, 2010

(54) DEBRIS APPARATUS AND METHOD FOR COLLECTING DEBRIS FROM A DRIVE SHAFT CHANNEL IN A TRANSMISSION APPARATUS

(75) Inventor: Christopher Wayne Vaughn, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 908 days.

(21) Appl. No.: 11/220,795

(22) Filed: Sep. 6, 2005

(65) Prior Publication Data

US 2006/0060025 A1    Mar. 23, 2006

Related U.S. Application Data

(60) Provisional application No. 60/612,270, filed on Sep. 22, 2004.

(51) Int. Cl.
*F16H 61/00* (2006.01)

(52) U.S. Cl. .................................... 74/606 R

(58) Field of Classification Search .............. 74/412, 74/416, 421 A, 424.5, 425, 606 R, 640, 665 A, 74/665 C, 665 H, 665 T; 111/149, 150
See application file for complete search history.

(56) References Cited

U.S. PATENT DOCUMENTS

| 1,003,096 | A |   | 9/1911  | Fawcett |
|-----------|---|---|---------|---------|
| 1,561,589 | A |   | 11/1925 | Bates   |
| 2,623,764 | A |   | 12/1952 | Naylor  |
| 3,481,036 | A | * | 12/1969 | Slaughter ................. 30/124 |
| 4,227,104 | A | * | 10/1980 | Hamman ................. 310/75 R |
| 5,878,607 | A | * | 3/1999  | Nunes et al. ............. 30/124 |
| 6,242,824 | B1 | * | 6/2001 | Torii et al. ............... 310/42 |

* cited by examiner

*Primary Examiner*—Vicky A Johnson
(74) *Attorney, Agent, or Firm*—Jenkins, Wilson, Taylor & Hunt, P.A.

(57) ABSTRACT

A debris apparatus and method are provided for collecting small particle debris such as dust and dirt from a transmission apparatus. The transmission apparatus can include a housing having a drive shaft channel for receiving a drive shaft. The debris pocket can include one or more radial ribs, which can be spaced apart when there are two or more, disposed peripherally along an inner wall of the drive shaft channel. The debris pocket can collect small particle debris so that at least a portion of the debris is prevented from further movement along the drive shaft channel where it could potentially interfere with desirable rotational movement of the drive shaft.

27 Claims, 10 Drawing Sheets

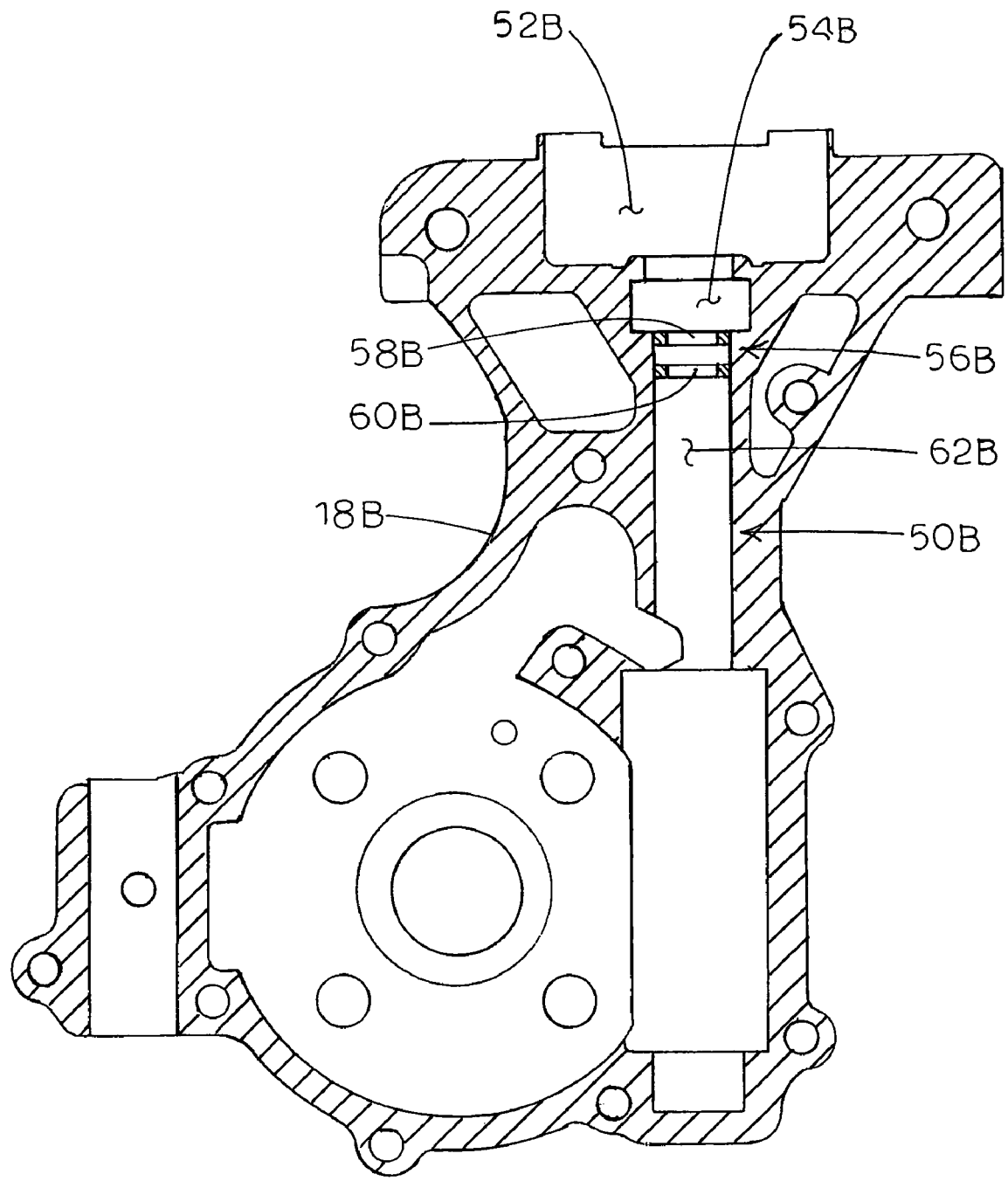
Fig · 3B

DEBRIS APPARATUS AND METHOD FOR COLLECTING DEBRIS FROM A DRIVE SHAFT CHANNEL IN A TRANSMISSION APPARATUS

RELATED APPLICATION

This application claims the benefit of U.S. Provisional Patent Application Ser. No. 60/612,270, entitled Debris Apparatus And Method For Collecting Debris From A Drive Shaft Channel In A Transmission Apparatus, filed Sep. 22, 2004, the disclosure of which is incorporated herein by reference in its entirety.

TECHNICAL FIELD

The present disclosure relates generally to transmission apparatuses and methods. More particularly, the present disclosure relates to apparatuses and methods for collecting small particle debris from within a drive shaft channel of a transmission of a working machine, such as, for example, a tiller.

BACKGROUND

A variety of apparatuses or machines utilize a transmission adapted for receiving a drive shaft wherein the drive shaft is interconnected to an engine for providing rotational energy to an enclosed drive shaft. In many such instances, the drive shaft within the transmission is not completely sealed within the transmission housing and is instead in open air communication with the exterior of the transmission housing. Such a configuration can be used for example with working machines such as, for example, tillers and other machines, wherein rotational energy provided by a crankshaft of an engine outside of the transmission housing engages a clutch mechanism connected to a drive shaft extending within the transmission housing in order to rotate the drive shaft within the transmission housing. The drive shaft can include appropriate gearing that is typically interconnected with other gearing in order to provide rotational energy to a rotor shaft. At least a portion of the drive shaft within the transmission housing, such as the gearing, can be provided with grease as necessary in order to facilitate interconnection and operation of the drive shaft and associated gearing. During operation, however, a problem exists when debris, such as dirt, dust or other small particles, enter the transmission housing along the drive shaft and create undesirable friction. This can result in failure of the drive shaft or portions associated therewith.

It is therefore desirable to provide a novel debris apparatus and method for collecting debris from a drive shaft channel in a transmission apparatus.

SUMMARY

According to one aspect of the subject matter disclosed herein, a transmission apparatus and method are provided wherein the transmission apparatus includes a housing having a drive shaft channel therein for receiving a drive shaft. A debris pocket is provided in communication with the drive shaft channel and adapted for collecting debris, such as small particles like dust and dirt, from within the drive shaft channel. In one embodiment, the debris pocket comprises a debris channel which can include one or more radial ribs, which can be spaced apart when there are two or more, disposed peripherally along an inner wall of the drive shaft channel.

The drive shaft channel of the transmission apparatus is, as noted above, adapted for receiving a drive shaft. Rotational energy can be provided by an engine and through a clutch connected with the drive shaft to provide rotational movement of the drive shaft within the drive shaft channel of the transmission apparatus. Suitable gearing associated the drive shaft can operatively connect and turn gearing associated with a rotor shaft to transfer rotational energy from the engine, through the drive shaft, and to the rotor shaft. In a working machine such as a tiller, for example, a plurality of tillage times or blades can be attached to the rotor shaft for rotational movement. At least a portion of the drive shaft, particularly the associated gearing, can be provided with grease in order to lubricate and facilitate rotational movement within the drive shaft channel. During operation, small particle debris, such as for example dust and dirt, may enter the drive shaft channel. In accordance with present disclosure, the debris pocket can be used to collect such small particle debris so that at least a portion of the debris is prevented from further movement along the drive shaft channel where it could potentially interfere with desirable rotational movement of the drive shaft.

It is therefore an object of the presently disclosed subject matter to provide a novel debris apparatus and method for collecting debris within a drive shaft channel of a transmission apparatus. An object having been stated hereinabove, and which is achieved in whole or in part by the present disclosure, other objects will become evident as the description proceeds when taken in connection accompanying drawings as best described below.

BRIEF DESCRIPTION OF THE DRAWINGS

FIGS. 3a and 3b of the drawings are isolated, vertical cross-sectional views of a right side and a left side, respectively, of a transmission case shown in FIG. 2;

DETAILED DESCRIPTION

Figure 1:
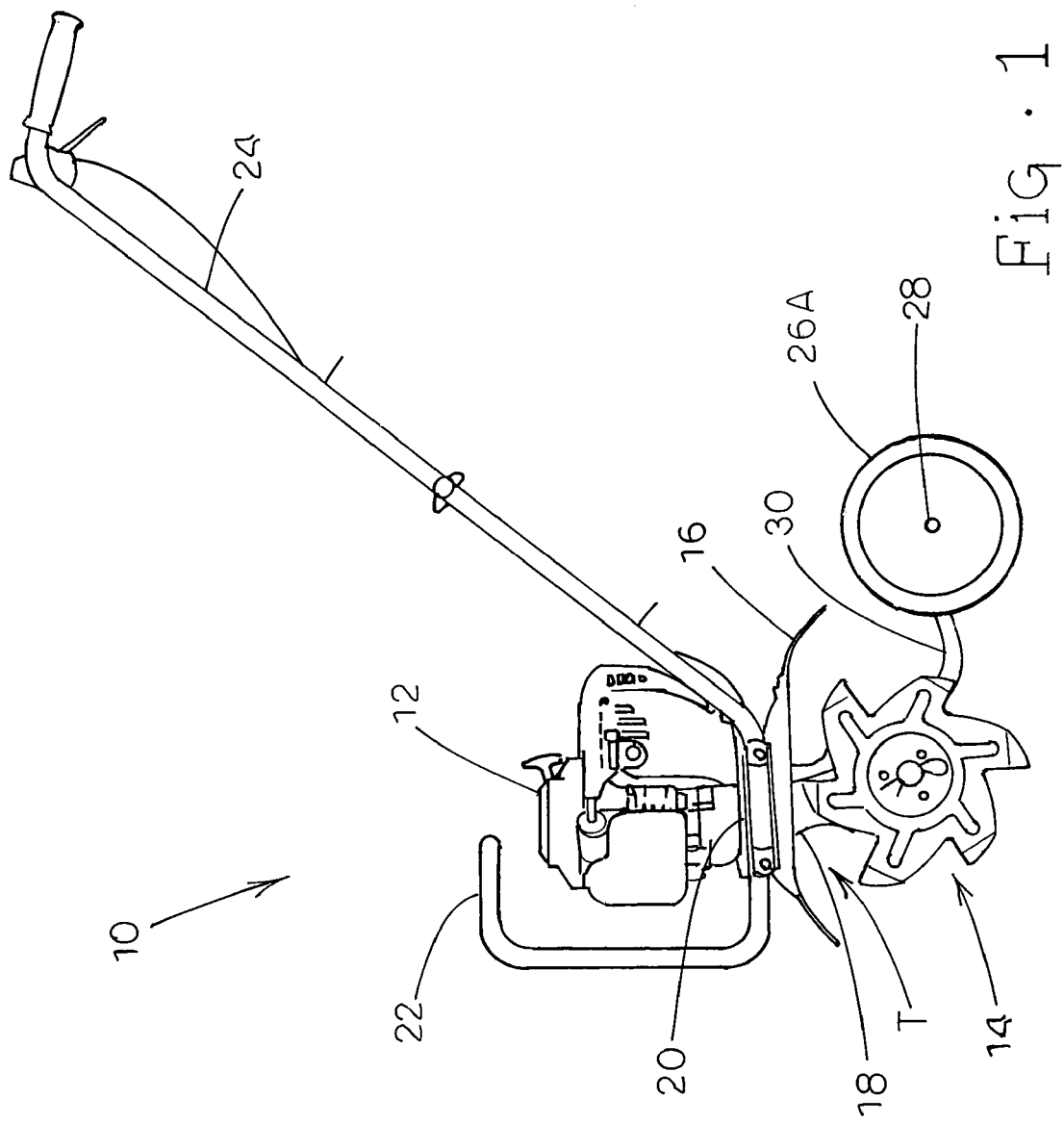
FIG. 1 is a left side elevation view of a working machine shown as a tiller.

Referring to FIG. 1 of the drawings, and in accordance with the subject matter disclosed herein, a working machine is shown in one embodiment as a tiller, generally designated 10 which can utilize a transmission case described in detail below. Tiller 10 is just one example of a working machine in accordance with the present subject matter as it is envisioned and can readily be appreciated by those of skill in the art that a debris apparatus and method as described herein can be utilized in any suitable apparatus or machine with a rotating shaft. As such, the description of the present subject matter with respect to tiller 10 is exemplary in nature and does not limit the scope of the debris apparatus and method described herein.

Figure 2:
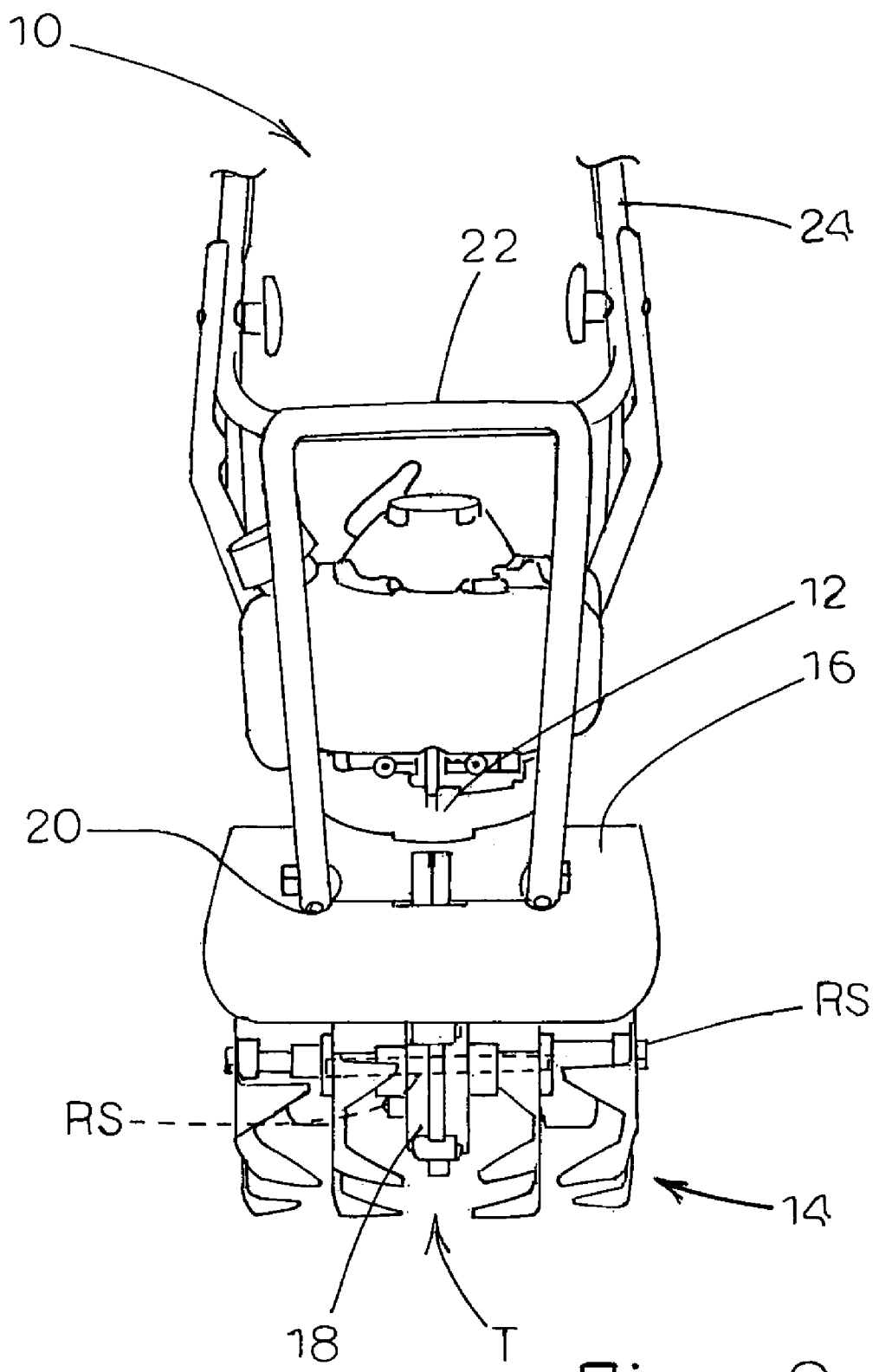
FIG. 2 is a front elevation view of the tiller shown in FIG. 1.

As illustrated in FIGS. 1 and 2, tiller 10 is a walk-behind, self-propelled tiller that includes a power source which can be an engine 12. A transmission generally designated T is provided for transferring rotational energy from engine 12 to a rotate a rotor shaft RS, shown in phantom in FIG. 2. Additional shaft portions can be connected with rotor shaft RS as shown in FIG. 2 for attachment with a plurality of tillage tines generally designated 14. Tillage tines 14 can, when forcibly rotated by power provided from engine 12, propel tiller 10 to perform a tilling operation. A fender 16 can be attached to transmission case 18 and provided with tiller 10 to cover tillage tines 14 and to prevent dirt and any other tilled material from undesirably scattering during operation.

Tiller 10 can include an elongated bar generally designated 20 that can be attached to transmission case 18 or a lower part of engine 12. In one aspect and as illustrated in FIGS. 1 and 2 of the drawings, bar 20 can include one end portion which forms a guard bar 22 for protecting engine 12. As also shown in FIGS. 1 and 2, bar 20 can include another, opposite end portion which is connected to a control bar 24 that can be of any suitable shape or configuration. As shown, control bar 24 is an elongate, general U-shaped bar with ends which can include handle grips thereon and can hold a mechanism for operating tiller 10. As can be appreciated by those of skill in the art, control bar 24 could be integral with bar 20 rather than being connected thereto. Tiller 10 can also include rotatable stabilizing means which can be positioned rearwardly from tillage tines 14 and can be a plurality of co-axially aligned wheels. Wheel 26a is shown in FIG. 2 for illustration purposes and can, like any additional wheels, be attached to a central shaft 28. A wheel arm 30 can be attached at one end to shaft 28 and at an opposite end to transmission case 18 to connect shaft 28 with tiller 10.

Figure 3A:
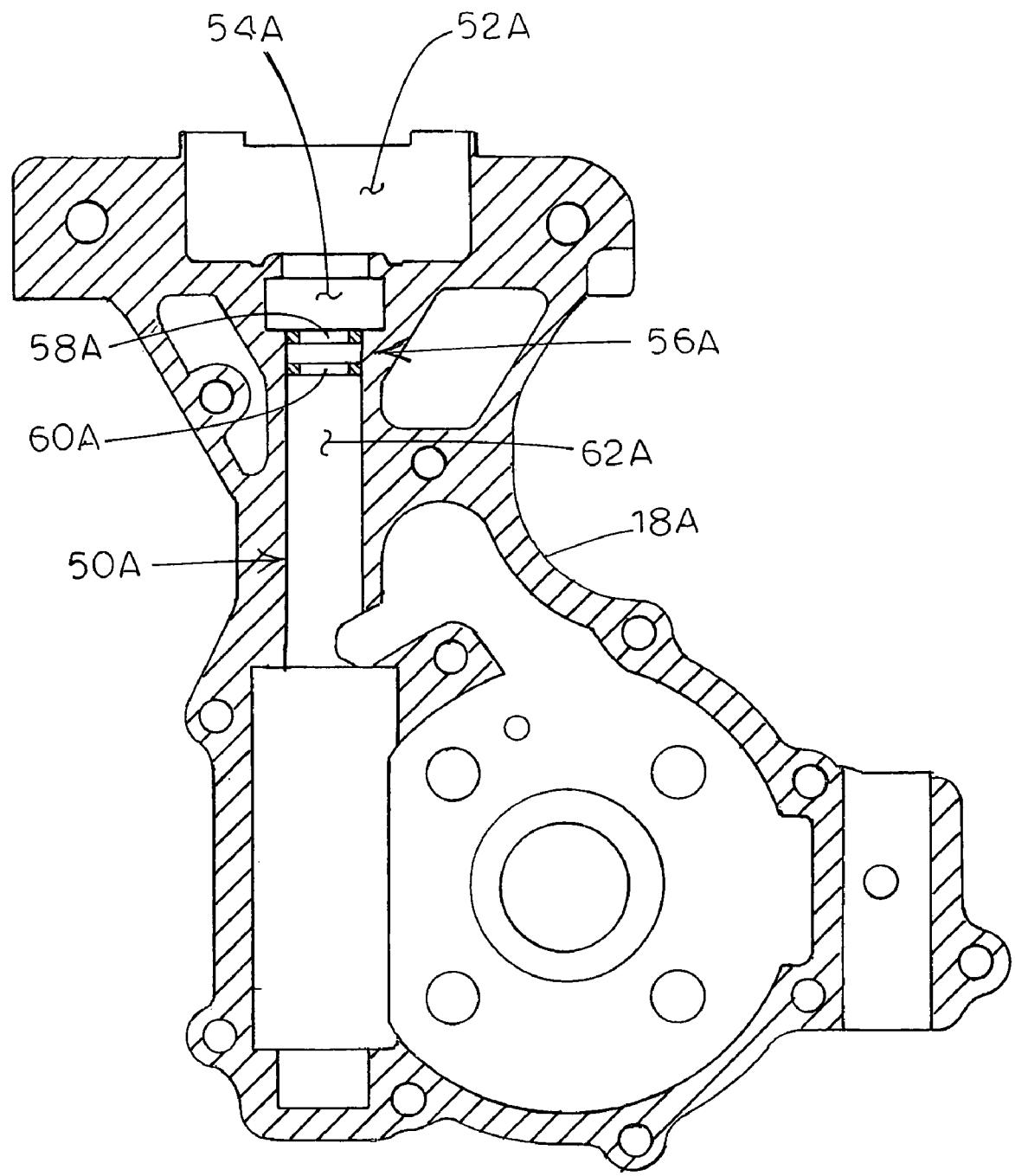

Referring now to FIGS. 3a and 3b of the drawings, right side 18a and left side 18b vertical, cross-sectional views, respectively, of transmission case 18 from FIGS. 1 and 2 are provided. Sides 18a and 18b can be attached and fitted together to together to create transmission case 18 shown in FIGS. 1 and 2. Each transmission case side 18a and 18b can include a drive shaft channel generally designated 50a and 50b, respectively, such that a single drive shaft channel as described further below can be formed when sides 18a and 18b are fitted and attached together. Drive shaft channels 50a and 50b of transmission case sides 18a and 18b, respectively, are therefore adapted to together contain a drive shaft described further below such that a drive shaft can be rotationally moved within transmission case 18. Transmission case sides 18a and 18b are illustrated in FIGS. 3a and 3b, respectively, without a drive shaft in place in drive shaft channels 50a and 50b, respectively.

Drive shaft channels 50a and 50b of sides of 18a and 18b, respectively, can include clutch recesses 52a and 52b, respectively, and can also include bearing recesses 54a and 54b respectively. In accordance with the present disclosure, transmission case sides 18a and 18b can also advantageously include debris pockets generally designated 56a and 56b, respectively, for collecting debris, such as small particle debris including dust and dirt, from within drive shaft channels 50a and 50b, respectively. Debris pockets 56a and 56b as illustrated in one embodiment in FIGS. 3a and 3b can include upper radial ribs 58a and 58b, respectively, and can additionally include lower radial ribs 60a and 60b, respectively. Upper radial ribs 58a and 58b and lower radial ribs 60a and 60b can each be disposed peripherally on and extend from inner walls 62a and 62b, respectively. Debris pockets 56a and 56b are described in further detail below.

Figure 4:
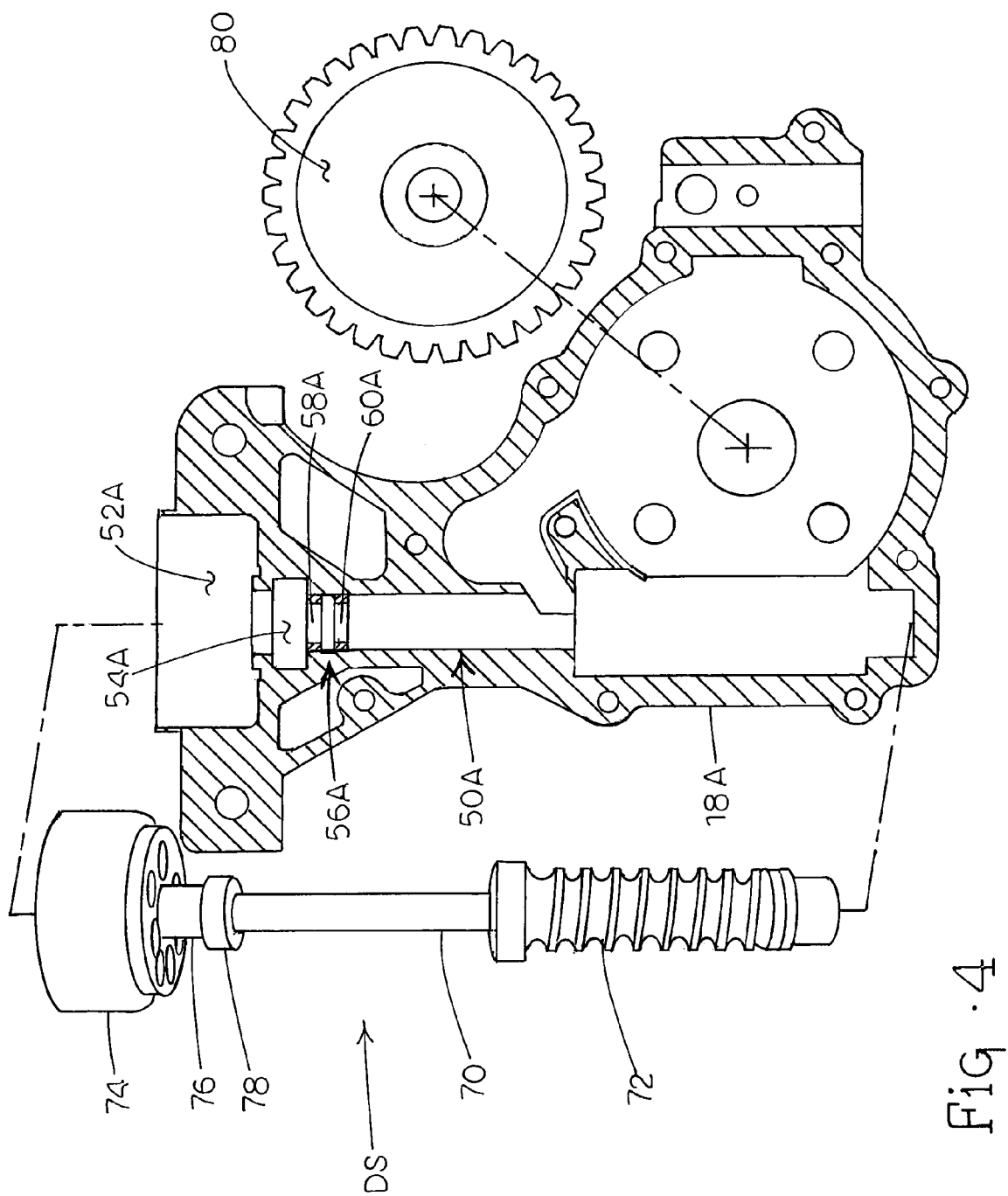
FIG. 4 is a partially exploded, vertical cross-sectional view of a transmission case according the present disclosure.
Figure 5:
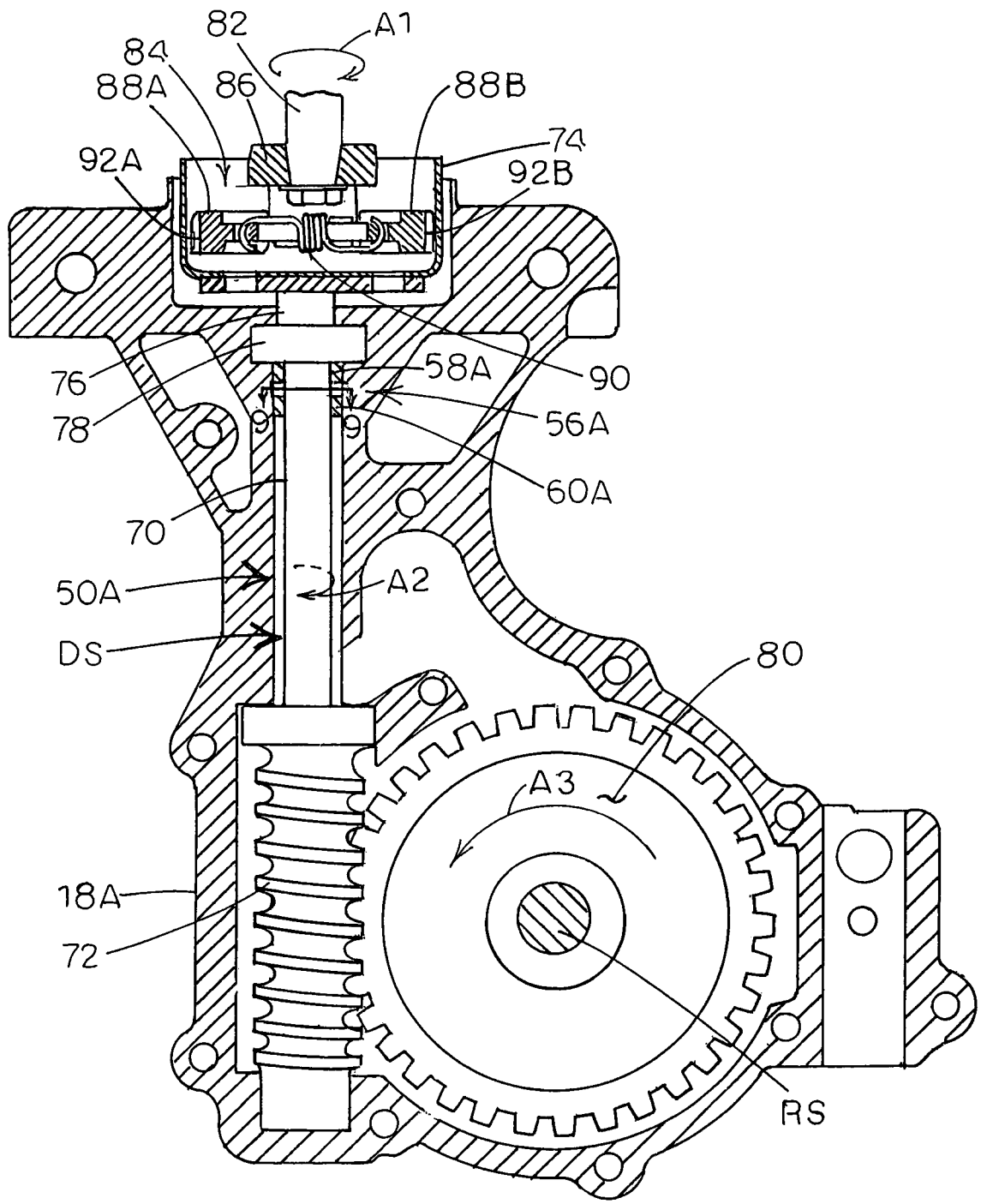
FIG. 5 is a vertical cross-sectional view of the transmission case shown in FIG. 4 with the drive shaft and associated gearing in place in the transmission case.

Referring now to FIGS. 4 and 5 of the drawings, transmission case right side 18a is illustrated in vertical cross-section as in FIG. 3a and additionally illustrates components for placement and positioning within transmission case side 18a. In accordance with the present disclosure and the drawings described above, it is understood that transmission case side 18b, as illustrated in FIG. 3b, can be placed upon and securably attached to transmission case side 18a in order to contain and provide a housing for rotational movement of a drive shaft and associated gearing therein. As shown in FIGS. 4 and 5, drive shaft generally designated DS can be positioned within drive shaft channel 50a of transmission case side 18a. Drive shaft DS can include a smooth shaft portion 70 and a worm 72. On an upper end of drive shaft DS, an outer clutch cup 74 can be provided and can include a mounting boss 76 for attachment to drive shaft DS. Alternatively, mounting boss 76 can be integrally connected with drive shaft DS. A bearing 78 can be provided on shaft portion 70 of drive shaft DS and is adapted for placement within bearing recess 54a of transmission case side 18a. Worm gear 80 can be attached to rotor shaft RS (FIG. 5) and can be positioned on transmission case side 18a and adapted for operative interconnection with worm 72 in order to provide rotational movement to rotor shaft RS. Worm 72 can be formed integrally with transmission shaft DS and worm gear 80 can be a worm wheel serving as a driven gear.

Referring specifically to FIG. 5 of the drawings, the portion of output shaft 82, also known as a crankshaft, which extends from engine 12 (shown in FIGS. 1 and 2) is illustrated and interconnectedly operates in association with drive shaft DS through a clutch generally designated 84. Engine output shaft 82 can be in a co-axial relationship with drive shaft DS. Clutch 84 and clutch cup 74 in FIG. 5 are illustrated in sectional view for illustration purposes. As can be appreciated by those of skill in the art, clutch 84 can be a centrifugal clutch designed to produce a centrifugal force in order to transmit rotation of engine output shaft 82 to drive shaft DS based upon an engine speed produced by engine 12. Clutch 84 can include a driving member 86 attached to a lower end of engine output shaft 82 and a pair of right and left centrifugal members 88a and 88b which can be radially movably mounted to driving member 86. Clutch 84 can additionally include a spring 90 adapted for urging centrifugal members 88a and 88b in a radially inward direction. Friction plates 92a and 92b can be provided with clutch 84, and rotational movement of engine output shaft 82 to a predetermined value can cause centrifugal members 88a and 88b to move radially and outwardly against a force exerted by spring 90 on centrifugal members 88a and 88b. In this manner, friction plates 92a and 92b can press against the inner, peripheral surface of clutch cup 74. Motive power from engine 12 can therefore be transferred through clutch 84 to cause corresponding rotational movement of drive shaft DS.

While contained within the assembled transmission case 18 (shown for example in FIGS. 1 and 2) drive shaft DS can be at least partially supported within the drive shaft channel (channels 50a and 50b together) by bearing 78 being positioned within bearing recesses 54a and 54b. When transmission case sides 18a and 18b are together, bearing recesses 54a and 54b define a single, bearing recess that can be circular in shape with a diameter greater than a diameter of the drive shaft channel. One or more additional bearings could also be utilized to maintain drive shaft DS in position. As can be understood by those of skill in the art, rotational movement of engine output shaft 82 in the direction of arrow A1 can transfer through clutch 84 and provide corresponding corresponding rotational movement of drive shaft DS in the direction of arrow A2, which rotates worm 72. Such rotational movement of worm 72 through its contact with the teeth of worm gear 80 causes rotational movement of worm gear 80 and fixedly attached rotor shaft RS in the direction of arrow 83. As illustrated in FIG. 5, it therefore can be understood that rotational movement of shaft portion 70 of drive shaft DS preferably does not frictionally engage drive shaft channel 50a (or 50b when referring to transmission case side 18b). As noted previously, debris pocket 56a is provided in accordance with the presently disclosed subject matter and as illustrated in FIG. 5 can comprise a plurality of peripherally extending, spaced-apart radial ribs, such as for example, upper radial rib 58a and lower radial rib 60a illustrated in transmission case side 18a of FIG. 5.

Figure 6:
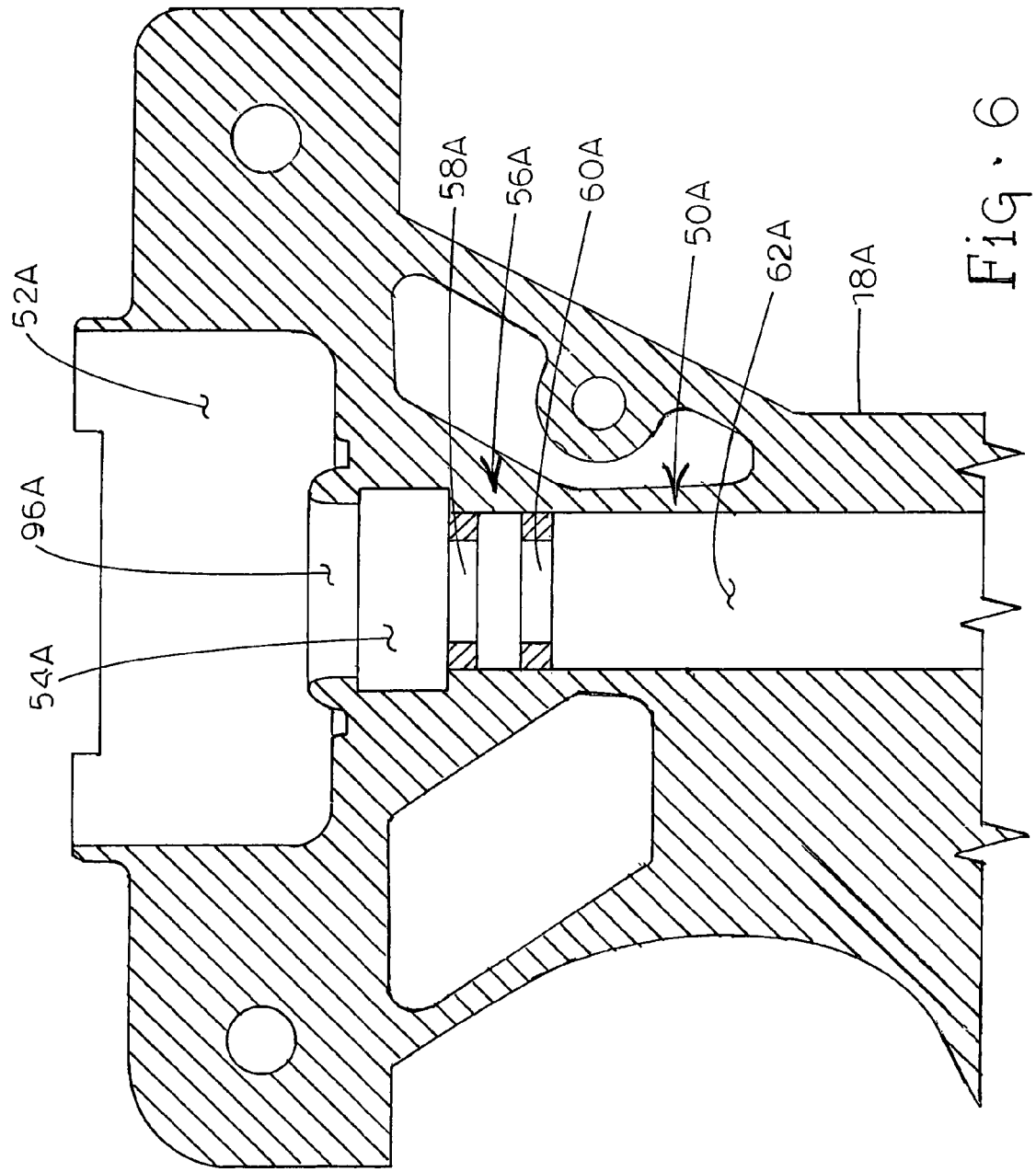
FIG. 6 is an enlarged, vertical cross-sectional view of the transmission case shown in FIG. 3.
Figure 7:
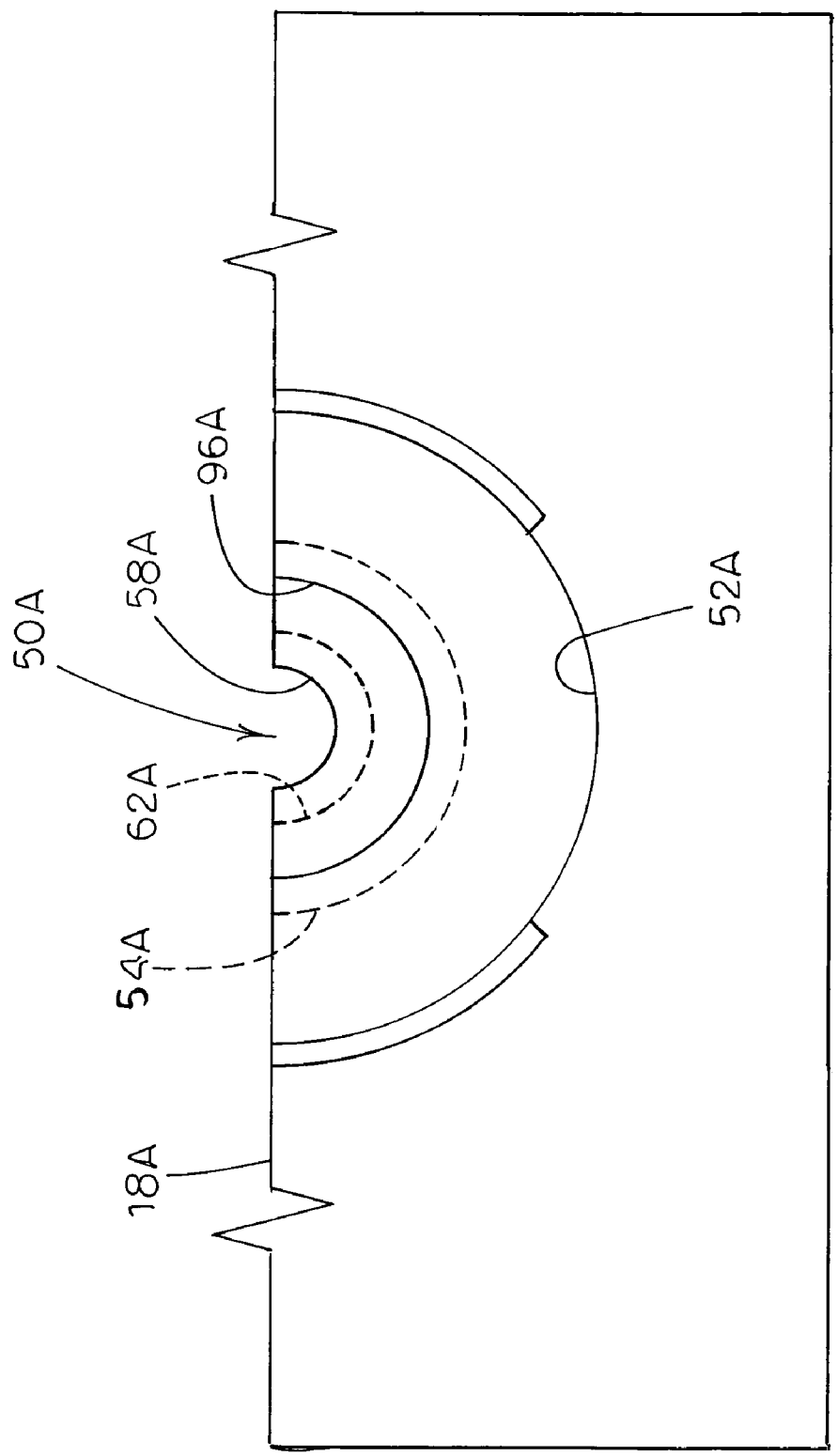
FIG. 7 is a top, end view of the right side of the transmission case as shown in FIG. 6 illustrating the drive shaft channel.

Referring now to FIGS. 6 and 7, the upper end of drive shaft channel 50a is illustrated. FIG. 6 is an enlarged, partial, vertical cross-sectional view of the end of an upper portion of transmission case side of 18a and illustrates debris pocket 56a along with upper radial rib 58a and lower radial rib 60a in drive shaft channel 50a. As illustrated, debris pocket 56a can be a debris channel disposed peripherally about inner wall 62a of drive shaft channel 50a. Radial ribs 58a and 60a are spaced apart and either attached directly to or formed integrally with inner wall 62a of drive shaft channel 50a. Radial ribs 58a and 60a as illustrated form opposing walls for debris pocket 56a, and inner wall 62a provides a bottom surface for debris pocket 56a. It is envisioned that a separate bottom surface could be inserted or used for debris pocket 56a instead of utilizing inner wall 62a of drive shaft channel 50a as the bottom surface. It is further envisioned that the bottom surface of debris pocket 56a could be positioned even further away from drive shaft channel 50a if desired, such as by forming a deeper recess in inner wall 62a between radial ribs 58a and 60a. Upper radial rib 58a is illustrated in a position adjacent to bearing recess 54a of drive shaft channel 50a. It can be understood therefore that when transmission case sides 18a and 18b (from FIG. 3b) are fitted and assembled together to form a single drive shaft channel 50, upper radial ribs 58a and 58b and lower radial ribs 60a and 60b of transmission case sides 18a and 18b, respectively, together form a debris channel which can extend entirely and peripherally around inner walls 62a and 62b as described and illustrated further below.

Referring now to FIG. 7 of the drawings, an upper end view of transmission case side 18a is provided looking into drive shaft channel 50a. As illustrated, upper radial ribs 58a extend about the entire periphery of drive shaft channel 50a in a direction at least substantially perpendicular to the direction of extension or elongation of drive shaft channel 58a. Inner wall 62a of drive shaft channel 50a and bearing recess 54a are illustrated in phantom in FIG. 7. As illustrated in FIG. 7 and also shown in FIG. 6, mounting boss recess 96a is between clutch recess 52a and bearing recess 54a and adapted for receiving mounting boss 76 from drive shaft DS (shown previously).

Figure 8:
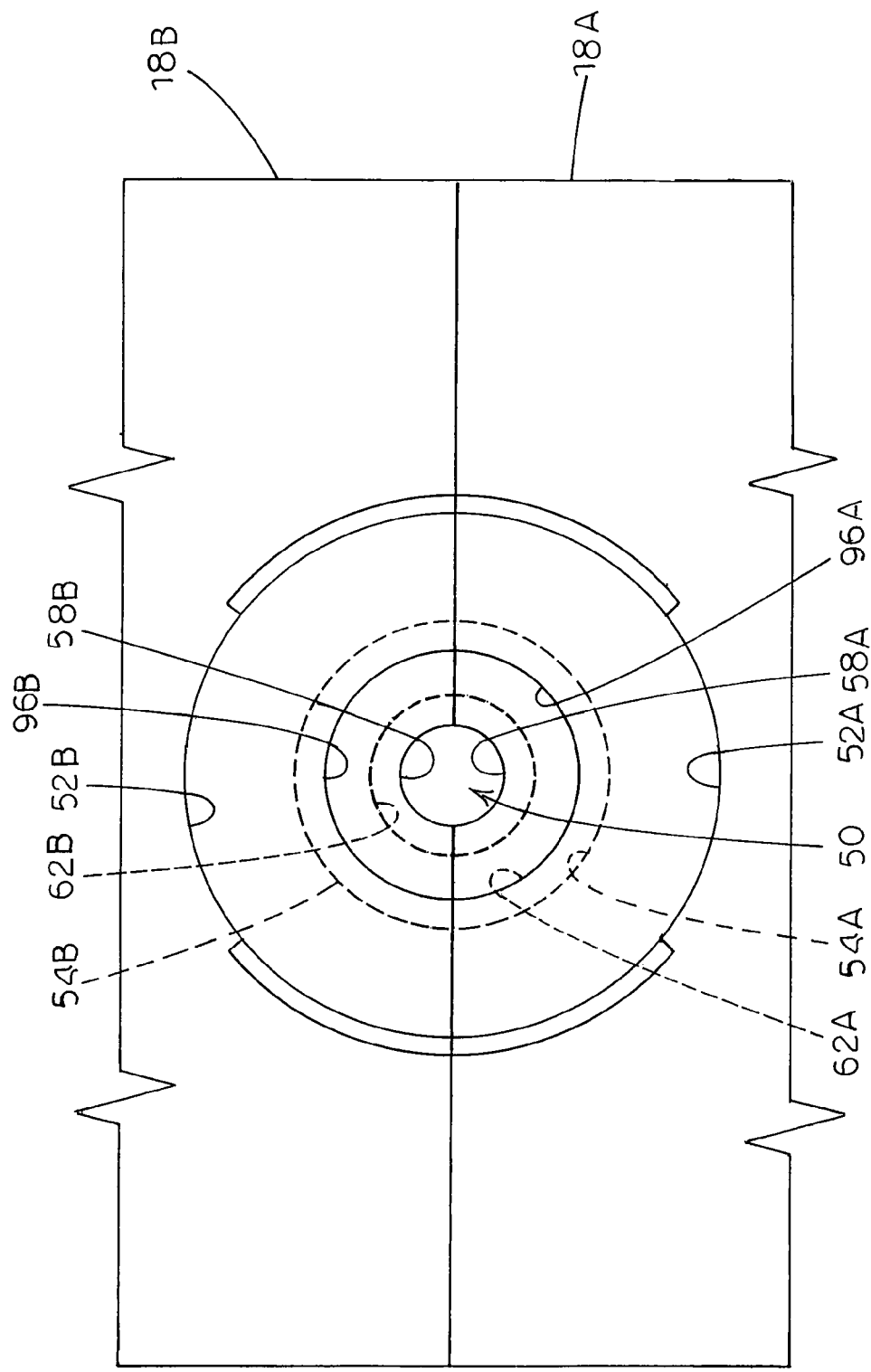
FIG. 8 is a top, end view of an assembled transmission case illustrating the draft shaft channel.

Transmission case sides 18a and 18b are shown attached and fitted together in FIG. 8 of the drawings wherein an end view looking into drive shaft 50 is provided. As illustrated, upper radial ribs 58a and 58b of transmission case sides 18a and 18b, respectively, abut one another in order to form a continuous radial rib or wall extending from inner walls 62a and 62b, respectively. Although not specifically shown in FIG. 8, lower radial ribs 60a and 60b can also abut one another as do upper radial ribs 58a and 58b in FIG. 8 in order to form a continuous radial rib or wall peripherally extending from inner walls 62a and 62b of transmission case sides 18a and 18b, respectively.

Figure 9:
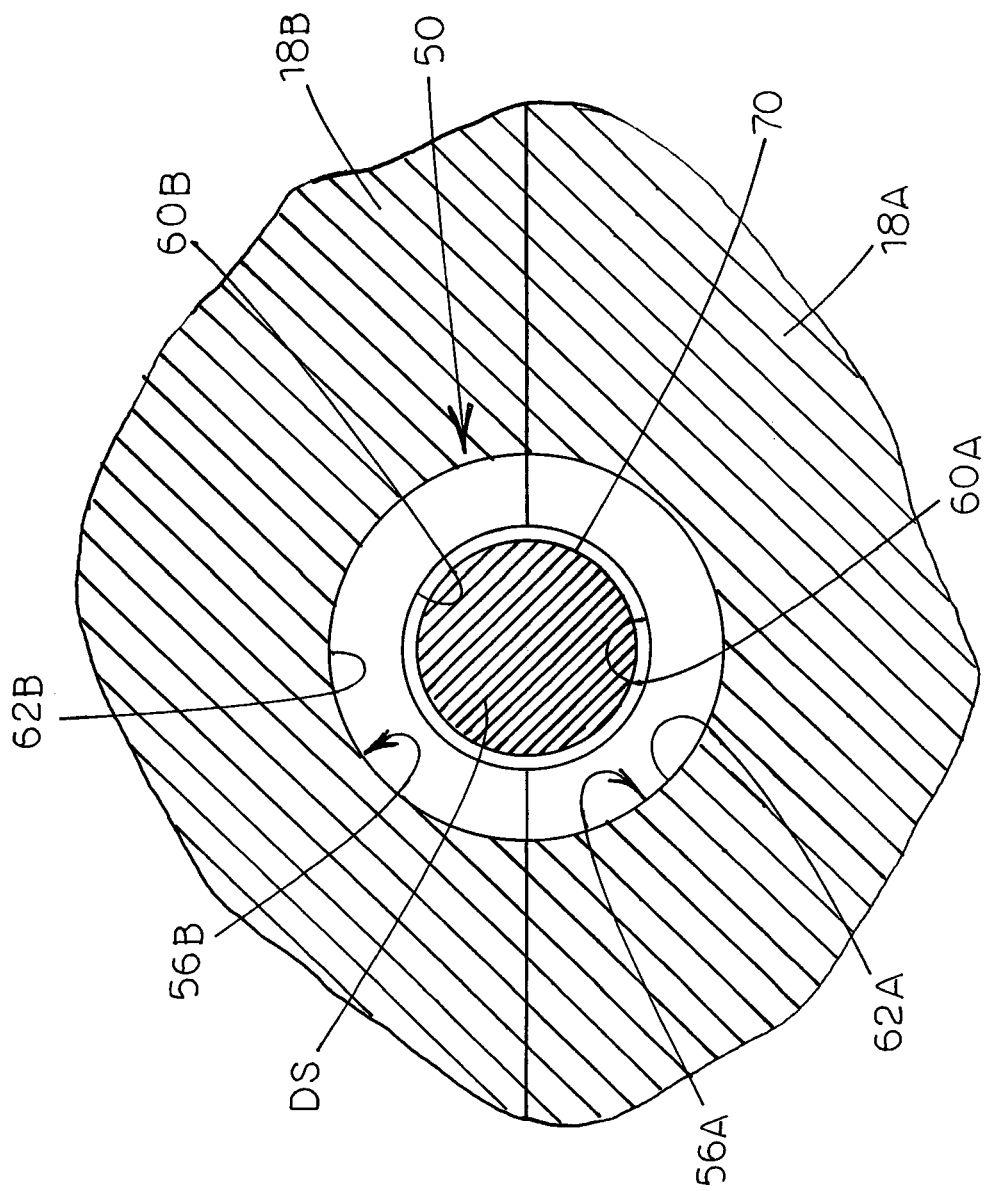
FIG. 9 is a cross-sectional view drawn along line 9-9 of FIG. 5 and illustrating the lower radial ribs.

FIG. 9 of the drawings provides a sectional view drawn along 9-9 of FIG. 5. For illustration purposes, transmission case side 18b is illustrated in FIG. 9 fitted on and attached to transmission case side 18a. Drive shaft DS is positioned within drive shaft channel 50. Radial ribs 60a and 60b extend from inner walls 62a and 62b, respectively, and form an inner opening therebetween that can be circular or at least substantially circular in cross-section. The diameter of such opening is therefore less than the diameter of drive shaft channel 50, but greater than the diameter of drive shaft DS. As shown in FIG. 9, drive shaft DS can be supported in position within drive shaft channel 50 for rotational movement with radial ribs 60a and 60b extending from inner walls 62a and 62b, respectively, very close to drive shaft DS, but without frictionally engaging or otherwise contacting drive shaft DS in order to allow free, rotational movement of drive shaft DS within drive shaft channel 50. Small particle debris, such as for example dust and dirt, can be collected within debris pockets 56a and 56b, which as illustrated in FIG. 9 can together form a single debris channel peripherally surrounding drive shaft DS. Although upper radial DS. Although upper radial ribs 58a and 58b of transmission case sides 18a and 18b, respectively, are not shown in the view provided by FIG. 9, a view in the opposite direction of line 9-9 of FIG. 5 would be identical to the view provided in FIG. 9 with the exception of showing upper radial ribs 58a and 58b instead of lower radial ribs 60a and 60b. As noted above, drive shaft DS can be supported within drive shaft channel 50 in any suitable manner in order to maintain a spaced-apart relationship with lower radial ribs 60a and 60b (and also upper radial ribs 58a and 58b). As can be appreciated by the description provided herein, drive shaft DS can be maintained and supported in position within drive shaft channel 50 by, for example, bearing 78 positioned within bearing recesses 54a and 54b of transmission case sides 18a and 18b. This allows drive shaft DS to be maintained in an axial position within drive shaft DS for rotational movement without contacting radial ribs 60a or 60b (or 58a or 58b).

During operation of a working machine and with reference to all of the figures of drawings, it is possible for small particle debris such as dust and dirt to pass around, or even through apertures of, outer clutch cup 74 and enter the drive shaft channel defined by drive shaft channels 50a and 50b in transmission case sides 18a and 18b, respectively. Such debris can continue down drive shaft DS and pass around bearing 78 of drive shaft DS. At that point, and based upon the configuration as illustrated in the various figures of drawings, the debris can then encounter upper radial ribs 58a and 58b, where the debris passes between the small opening between drive shaft DS and upper radial ribs 58a and 58b and then enters debris pockets 56a and 56b. In the debris pocket or channel formed between upper radial ribs 58a and 58b and lower radial ribs 60a and 60b, it has been found that at least a portion of the debris will be collected during operation of drive shaft DS. It is believed that such debris comes into contact with vaporized grease within debris pockets 56a and 56b such that the debris is caused to fall out of the air and stick to the interior surfaces of the channel formed by debris pockets 56a and 56b. Utilizing this configuration, it has been found that the amount of debris which may pass lower radial ribs 60a and 60b and continue down drive shaft channel 50 can be optimally reduced in order to significantly minimize failure of drive shaft DS, which can be caused by friction created from excess debris within drive shaft DS.

Although a configuration of the channel formed by debris pockets 56a and 56b is provided and described above for illustration purposes, it is envisioned in accordance with the presence disclosure that other configurations could exist. For example, it is envisioned that debris pockets 56a and 56b could be positioned at any point along the length of drive shaft channel 50. One or more debris pockets could also be utilized together in series or even in a spaced-apart relationship. Additionally, the radial ribs could be configured and utilized such that a single radial rib is utilized for example after a bearing recess or other structure in order to form a debris pocket for collecting debris. Also, any number of radial ribs could be utilized, such as three or more, in order to provide multiple debris pockets for collecting debris. A radial rib could also be positioned in advance of and above a bearing recess so that debris could be collected in a debris pocket before encountering a bearing recess. Additionally and as noted above, while use of the presently disclosed subject matter has been indicated in connection with a tiller and tiller transmission, the subject matter described herein may be used with any structure that involves a rotating shaft.

It will be understood that various details of the presently disclosed subject matter may be changed without departing from the scope of the disclosure. Furthermore, the foregoing description is for the purpose of illustration only, and not for the purpose of limitation, as the subject matter is defined by the claims as set forth hereinafter.

What is claimed is:

1. A transmission apparatus for containing at least a portion of a drive shaft, the transmission apparatus comprising:
   (a) a housing having a drive shaft channel for containing at least a portion of a drive shaft for transmitting rotational movement of a motor to a driven element, the drive shaft channel having an inner wall having a channel diameter greater than a diameter of the drive shaft; and
   (b) a debris pocket in communication with the drive shaft channel and adapted for collecting debris from the drive shaft channel, the debris pocket formed by and between at least two spaced-apart radial ribs that are peripherally disposed at least partially along and extend inwardly from the inner wall of the drive shaft channel between the motor and the driven element, the radial ribs extending toward a center axis of the drive shaft channel and forming opposing openings along the center axis for a drive shaft to pass through the openings, the opening each having a diameter less than the channel diameter.

2. The transmission apparatus of claim 1 wherein the radial ribs extend completely around a diameter of the drive shaft channel.

3. The transmission apparatus of claim 1 wherein the radial ribs are identical.

4. The transmission apparatus of claim 1 wherein one of the radial ribs is adjacent a bearing recess within the drive shaft channel.

5. The transmission apparatus of claim 4 wherein the bearing recess has a diameter greater than a diameter of the debris pocket.

6. The transmission apparatus of claim 1 where in at least a portion of the drive shaft channel inner wall is at least substantially circular in cross section.

7. The transmission apparatus of claim 1 wherein the drive shaft channel comprises a bearing recess for receiving a bearing.

8. The transmission apparatus of claim 7 wherein the debris pocket is positioned proximate the bearing recess.

9. The transmission apparatus of claim 1 wherein a diameter of the debris pocket is substantially equal to the channel diameter.

10. The transmission apparatus of claim 1 wherein at least a portion of the inner wall of the drive shaft channel is disposed along the drive shaft channel with a substantially constant channel diameter, the radial ribs being peripherally disposed along and extending inwardly from the portion of the inner wall having a substantially constant channel diameter.

11. A transmission apparatus for housing at least a portion of a drive shaft, the transmission apparatus comprising:
   (a) a housing having an interior drive shaft channel extending at least partially through the housing for receiving a drive shaft adapted for rotational movement within the drive shaft channel to transmit rotational movement of a motor to a driven element, the drive shaft channel having an inner wall having a channel diameter greater than a diameter of the drive shaft;
   (b) a recess in the drive shaft channel for receiving a support structure attached to the drive shaft whereby the support structure can be maintained in position within the recess for the drive shaft to be maintained in a rotatable position in the drive shaft channel; and
   (c) a debris pocket within the housing in communication with the drive shaft channel for collecting small particle debris from the drive shaft channel, the debris pocket comprising a debris channel positioned between the motor and the driven element and proximate the recess of the drive shaft channel for extending at least partially around the drive shaft, the debris channel formed by and between at least two spaced-apart radial ribs that are peripherally disposed at least partially along and extend inwardly from the inner wall of the drive shaft channel between the motor and the driven element, the radial ribs extending toward a center axis of the drive shaft channel and forming opposing openings along the center axis for a drive shaft to pass through the openings, the openings each having a diameter less than the channel diameter.

12. The transmission apparatus of claim 11 wherein the radial ribs extend completely around a diameter of the drive shaft channel on the inner wall of the drive shaft channel.

13. The transmission apparatus of claim 11 wherein the inner wall is at least substantially circular in cross section.

14. The transmission apparatus of claim 11 wherein the debris channel is formed by and between two spaced-apart and identical radial ribs.

15. The transmission of claim 11 where the debris pocket is adjacent the bearing recess in the drive shaft channel.

16. The transmission apparatus of claim 11 wherein a diameter of the debris channel is substantially equal to the channel diameter.

17. The transmission apparatus of claim 11 wherein at least a portion of the inner wall of the drive shaft channel is disposed along the drive shaft channel with a substantially constant channel diameter, the radial ribs being peripherally disposed along and extending inwardly from the portion of the inner wall having a substantially constant channel diameter.

18. A transmission apparatus comprising:
   (a) a housing defining an inner drive shaft channel, the drive shaft channel having an inner wall having a channel diameter greater than a diameter of the drive shaft;
   (b) a drive shaft disposed with the drive shaft channel and adapted for operative connection with a motor to cause rotatable movement of the drive shaft in the drive shaft channel to transmit rotational movement of the motor to a driven element; and (c) a debris pocket within the drive shaft channel for collecting small particle debris, the debris pocket comprising a debris channel positioned between the motor and the driven element and extending at least partially around the drive shaft, the debris channel formed by and between two spaced-apart radial ribs that are peripherally disposed at least partially along and extend inwardly from the inner wall of the drive shaft channel between the motor and the driven element, the radial ribs extending toward a center axis of the drive shaft channel and forming opposing openings along the center axis with the drive shaft extending through the openings, the openings each having a diameter less than the channel diameter.

19. The transmission of claim 18 wherein the radial ribs peripherally extend completely around a diameter of the drive shaft channel and are spaced apart from the drive shaft without engaging the drive shaft.

20. The transmission apparatus of claim 19 where the radial ribs are identical.

21. The transmission apparatus of claim 19 wherein one of the radial ribs is adjacent a bearing recess of the drive shaft channel.

22. The transmission of claim 18 wherein a diameter of the debris channel is substantially equal to the channel diameter.

23. The transmission of claim 18 wherein at least a portion of the inner wall of the drive shaft channel is disposed along the drive shaft channel with a substantially constant channel diameter, the radial ribs being peripherally disposed along and extending inwardly from the portion of the inner wall having a substantially constant channel diameter.

24. A method of removing debris from a drive shaft channel of a transmission apparatus, the method comprising:
(a) providing a debris pocket within a transmission apparatus in communication with a drive shaft channel of the transmission apparatus, the debris pocket formed by and between at least two spaced-apart radial ribs that are peripherally disposed at least partially along and extend inwardly from an inner wall of the drive shaft channel between the motor and the driven element, the radial ribs extending toward a center axis of the drive shaft channel and forming opposing openings along the center axis for a drive shaft to pass through the openings, the openings each having a diameter less than a diameter of the inner wall of the drive shaft channel; and
(b) collecting debris from the drive shaft channel within the debris pocket.

25. The method of claim 24 wherein the radial ribs extend completely around a diameter of the drive shaft channel and further comprising collecting debris in the debris channel between the radial ribs.

26. The method of claim 24 a diameter of the debris pocket is substantially equal to the channel diameter.

27. The method of claim 24 wherein at least a portion of the inner wall of the drive shaft channel is disposed along the drive shaft channel with a substantially constant channel diameter, the radial ribs being peripherally disposed along and extending inwardly from the portion of the inner wall having a substantially constant channel diameter.

\* \* \* \* \*